US009705616B2

(12) United States Patent
Oldewurtel et al.

(10) Patent No.: US 9,705,616 B2
(45) Date of Patent: Jul. 11, 2017

(54) EVALUATION AND ACOUSTIC EMISSION OF AUDIO BROADCASTING SIGNALS IN A VEHICLE

(71) Applicant: AUDI AG, Ingolstadt (DE)

(72) Inventors: Frank Oldewurtel, Ingolstadt (DE); Christian Winter, Aurach (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/894,850

(22) PCT Filed: Feb. 19, 2014

(86) PCT No.: PCT/EP2014/000445
§ 371 (c)(1),
(2) Date: Nov. 30, 2015

(87) PCT Pub. No.: WO2014/194970
PCT Pub. Date: Dec. 11, 2014

(65) Prior Publication Data

US 2016/0119066 A1 Apr. 28, 2016

(30) Foreign Application Priority Data

Jun. 8, 2013 (DE) ........................ 10 2013 009 670

(51) Int. Cl.
*H04H 20/62* (2008.01)
*H04H 20/24* (2008.01)
(Continued)

(52) U.S. Cl.
CPC ............ *H04H 20/62* (2013.01); *H04H 20/24* (2013.01); *H04H 20/26* (2013.01)

(58) Field of Classification Search
CPC ......... H04N 20/74; H04H 20/62; H04H 20/24
(Continued)

(56) References Cited

U.S. PATENT DOCUMENTS 5,946,606 A * 8/1999 Shimizu ................. H04B 17/00 455/126
8,396,412 B2 * 3/2013 Lee ......................... A63F 13/12 455/135
(Continued)

FOREIGN PATENT DOCUMENTS

DE 10 2005 041 653 3/2007
DE 10 2009 000 465 8/2010
(Continued)

OTHER PUBLICATIONS

International Search Report issued by the European Patent Office in International Application PCT/EP2014/000445.

*Primary Examiner* — Nam V Nguyen
(74) *Attorney, Agent, or Firm* — Henry M. Feiereisen LLC

(57) ABSTRACT

The invention relates to a method for acoustically emitting audio broadcasting signals in a vehicle, wherein audio broadcasting signals can be transmitted into the vehicle and received there over a first and at least a second reception path, wherein the first reception path is evaluated by means of at least one criterion parameter on the basis of an audio broadcasting signal that can be received over the first reception path, and the second reception path is likewise evaluated by means of a criterion parameter on the basis of the audio broadcasting signal that can be received over the second reception path. During an emission of the audio broadcasting signal over one of the reception paths, a preparation phase for preparing a switchover from the current reception path to the other reception path is started on the basis of a comparison of the criterion parameter of the current reception path to a first threshold value (S1). In the preparation phase, the criterion parameter of the current reception path is compared to a second threshold value (S2) that is lower than the first threshold value (S1), and an
(Continued)

examination of the switchover to the other reception path is performed if the criterion parameter of the current reception value is below the second threshold value (S2).

18 Claims, 2 Drawing Sheets

(51) Int. Cl.

| | |
|---|---|
| ***H04B 1/18*** | (2006.01) |
| ***H02B 1/00*** | (2006.01) |
| ***H04H 20/26*** | (2008.01) |

(58) Field of Classification Search

USPC ..... 340/10.1, 7.48, 9.1, 7.39; 455/3.02, 135, 455/566, 553.1, 552.1

See application file for complete search history.

(56) References Cited

U.S. PATENT DOCUMENTS 8,620,248 B2 * 12/2013 Dehlink ................ G01S 7/4021 342/174
2006/0245605 A1 * 11/2006 Matsunaga ............ H04H 40/18 381/123
2007/0197174 A1 8/2007 Kim et al.
2009/0176469 A1 7/2009 Nagara et al.
2010/0203823 A1 8/2010 Apaar
2012/0129475 A1 5/2012 Mere
2012/0163773 A1 6/2012 Matsumoto

FOREIGN PATENT DOCUMENTS

| | | | |
|---|---|---|---|
| DE | 10 2009 055 221 | 8/2010 | |
| DE | 10 2011 055 280 | 5/2012 | |
| DE | WO 2016074693 A1 * | 5/2016 | ............. H04H 20/26 |
| EP | 0 428 866 | 5/1991 | |
| EP | 1 233 556 | 8/2002 | |
| EP | 1 306 992 | 5/2003 | |
| EP | 2 026 482 | 2/2009 | |
| EP | 2 075 935 | 7/2009 | |
| EP | 2 244 481 | 10/2010 | |
| EP | 2 418 791 | 2/2012 | |
| JP | H11-196009 | 7/1999 | |
| WO | WO 2006/134516 | 12/2006 | |
| WO | WO 2015069611 A1 * | 5/2015 | ............. H04H 20/20 |

* cited by examiner

EVALUATION AND ACOUSTIC EMISSION OF AUDIO BROADCASTING SIGNALS IN A VEHICLE

CROSS-REFERENCES TO RELATED APPLICATIONS

This application is the U.S. National Stage of International Application No. PCT/EP2014/000445, filed Feb. 19, 2014, which designated the United States and has been published as International Publication No. WO 2014/194970 and which claims the priority of German Patent Application, Serial No. 10 2013 009 670.7, filed Jun. 8, 2013, pursuant to 35 U.S.C. 119(a)-(d).

BACKGROUND OF THE INVENTION

The invention relates to a method for acoustic emission of audio broadcasting signals in a vehicle in which audio broadcasting signals are transmitted via a first and at least one second receive path into the vehicle where they can be received, wherein the first receive path is assessed with at least one criterion parameter based on an audio broadcasting signal that can be received via the first receive path, and the second receive path is also evaluated with a criterion parameter based on an audio broadcasting signal that can be received via the second receive path.

Radio programs are traditionally and predominantly consumed in the vehicle via analog broadcast reception by way of AM (amplitude modulation) or FM (frequency modulation). The digital broadcast reception of radio programs, for example in the form of DAB (Digital Audio Broadcast), is available since several years as an additional receive path. An innovation for suitably equipped vehicles as an additional receive path is radio reception from the Internet via a mobile radio channel, i.e. Internet radio. Thus, the Internet radio does not use physical broadcast transmitters that need to be built stationary. All receive paths have from a user perspective different advantages and disadvantages in terms audio quality, latency relative to the origin signal, reception range and cost, which makes switching between different receive paths attractive for the user.

Disturbances can occur when the acoustic emission of an audio broadcasting signal is switched from one receive path, for example analog broadcast reception, to another, for example digital broadcast reception or Internet radio, which is due to the fact that the audio broadcasting signals on different receive paths can usually not be received in the vehicle in a synchronized fashion for technical reasons.

The document DE 10 2005 041 653 A1 describes a method for switching between analog and digital broadcast reception that is less perceptible for a user. Switching between the receive paths is here made possible by synchronizing the two audio broadcasting signals via a correlation method, without the user perceiving a gap or a repetition in the audio broadcasting signal.

SUMMARY OF THE INVENTION

It is an object of the present invention to make emission of audio broadcasting signals in the vehicle more user-friendly when changing a receive path.

This object is attained according to the invention with a method for acoustic emission of audio broadcasting signals in a vehicle, and with an information presentation system and with a vehicle configured to carry out the method.

The inventive method for acoustic emission of audio broadcasting signals in a vehicle includes the ability to transmit audio broadcasting signals into the vehicle over a first and at least one second receive path or receive channel, and be able to receive them in the vehicle. The first receive path is evaluated here by at least one criterion parameter based on an audio broadcasting signal receivable via the first receive path, and the second receive path is also evaluated by a criterion parameter based on the audio broadcasting signal receivable the second receive path. The criterion parameter may be a single parameter, such as a measurement variable, but may also be a superordinated parameter that includes several individual parameters. The audio broadcast signals and the receive paths are evaluated continuously and simultaneously, where checking is also possible at discrete time intervals.

The criterion parameters of the receive paths may be identical, i.e. may have identical measurement variables and/or parameters. However, the criterion parameters may also include divergent measurement variables and/or parameters, and may then be transformed into one another and compared, for example, by way of a comparison table or an algorithm.

It is essential here that during a broadcast of the audio broadcasting signal via one of the receive paths, i.e. the current receive path, a preparatory phase is started depending on a comparison of the criterion parameters of the current receive path with a first threshold. This preparatory stage is used to prepare a subsequent optional switching from the current receive path, i.e. the receive path via which the currently acoustically broadcast audio broadcasting signal is received, to the other receive path or, if multiple receive paths are available, the best receive path according to the assessment by the criterion parameter. In the preparatory phase, the criterion parameter of the current receive path is a compared with a second threshold value that is lower compared to the first threshold and when the second threshold is underrun, a check of switching to the other receive path is made.

When the quality of the current receive path or the quality of the transmitted audio broadcasting signal represented by the criterion parameter drops, a preparation for switching is made after a comparison with the first threshold value. If the quality of the broadcast audio broadcasting signal deteriorates further, which is detected when the criterion parameter drops below the second threshold value, a switchover to another receive path is checked. Advantageously, explicit measures that depend on both the current receive path and the other receive path(s) can be taken during the preparatory phase to enable the best possible switching between different receive paths, that are in the ideal case not perceptible by the user.

According to a preferred embodiment of the method of the invention, when checking the switchover, the criterion parameter of the other receive path is also compared with the second threshold value, and a switch is made to the other receive path, when this criterion parameter does not drop below the second threshold value or drops below it to a lesser degree than the drop below of the criterion parameter of the current receive path. In this way, it is advantageously ensured that a switchover to another receive path occurs only when this receive path or the audio broadcasting signal received via this receive path has a better quality than the audio broadcasting signal received via the current receive path.

According to an advantageous embodiment of the inventive method, the audio broadcasting signal received during the preparatory phase via the other receive path, which is possibly still to be broadcast after switching to the other receive path is cached. In this way, switching can advantageously be configured in a particularly pleasant manner for the user, for example without gaps, and for example inaudible switching can be realized by using a correlation method, thus attaining a seamless transmission of information. The preferred scale of caching, i.e., in particular the amount of the cached information, is here basically to be selected depending on current environmental conditions such as the local position of the vehicle, weather conditions or local reception conditions.

In particular, caching may only be started when the other receive path is a receive path where the information contained in the audio broadcasting signal is presented with a time offset represented by an offset time interval—i.e. delayed or advanced—in relation to the presentation of information over the current receive path. This has the advantage that technical delays during the switchover can be made inaudible or difficult to perceive for the user. In particular, pauses can hereby be bridged during switching or skipping of information can be avoided.

Preferably, caching is started when at least one of the other receive paths considered for future acoustic emission or representation of the audio broadcasting signal is a receive path where the audio broadcasting signals are transmitted via a mobile radio channel, in particular, when the Internet radio is a possible receive path for the transmission of the audio broadcasting signal. This has the advantage that in particular the delays that occur when a mobile radio channel due to intermediary providers as well as fluctuations in the transmission rate can be compensated by caching especially immediately after establishing a connection and, in particular, caused by a variable time offset predetermined by the Internet radio provider. For example, it can take up to 30 seconds after a connection to the Internet radio provider is established, depending on the available transmission speed, until the acoustic emission of an audio broadcasting signal received over the Internet, i.e. of an audio signal receivable over the Internet, can begin. This pause would be perceivable by the user as silence without preparatory caching and would be quite annoying.

In particular, caching may be started, when switching from a broadcast-based receive path to the Internet radio can or should be checked. This has the advantage that the particularly noticeable time offset between a broadcast-based receive path, especially a delay-free receive path such as FM or AM, and the relatively severely delayed Internet radio with a delay of, e.g. up to thirty seconds or even more, can be compensated and resulting breaks in the broadcasting of the audio broadcasting signal be avoided.

According to a preferred embodiment of the inventive method, the preparatory stage, in particular caching, is terminated when a switchover to the other receive path is actually performed and/or the first threshold value is exceeded toward higher values by the criterion parameter values at least for a definable time-out interval, which advantageously avoids unnecessary caching. This is the case, for example, when a switchover to a receive path occurred that does not require caching, or when a future switchover will no longer be necessary due to an improvement in the quality of the audio broadcasting signal received over the current receive path, thus obviating the need for caching. The predetermined time-out interval ensures that a short-term improvement in the quality of the current receive path does not cause deletion of the buffer, the content of which may be required shortly thereafter. Advantageously, therefore, the predetermined time-out interval is set so that short improvements of the quality of the current receive path, i.e. particularly erratic, Delta-peak-like improvements of quality do not cause caching to be terminated. Such a predeterminable time-out interval can be, for example, two seconds. In principle, the duration of the time-out interval can be dynamically determined or altered in response to changing environmental conditions, or can be previously fixed.

According to another embodiment of the method of the invention, switching from the current receive path to the other receive path occurs depending on whether the criterion parameter values drop below the second threshold value for at least a predeterminable underflow time interval. In this way, short Delta-peak-like deteriorations of the quality of the audio broadcast signal received over the current receive path do not cause switching to the other receive path that may be disadvantageous in the future. Frequent switching between different receive paths within a very short time, the so-called ping-pong effect, is avoided with an appropriate selection of the predetermined underflow time interval. An exemplary value for the predetermined underflow time interval is two seconds. In principle, the duration, of the underflow interval can be dynamically determined or altered in response to changing environmental conditions, or previously fixed.

In particular, the respective receive field strength and/or the respective signal-to-noise ratio (SNR) and/or the respective bit error rate (BER) and/or the data rate available in the used mobile network and/or the wireless network type, and/or potentially needed roaming and/or the decoder Audio Quality (Service) and/or the Fast Information Channel (FIC) and/or the Received Signal Strength Indicator (RSSI) and/or an existing stereo/mono switchover and/or a cost factor that maps, for example, energy consumption and/or resource utilization and/or monetary costs associated with the receive path, may be used as the criterion parameters of the different receive paths. Advantageously, the quality of the receive paths is here imaged directly and immediately, i.e. very quickly, in the criterion parameter.

Furthermore, the criterion parameter of the different receive paths may be processed by way of signal processing steps and/or other mathematical methods or calculations—for example, via an averaging, weighted integration, or a convolution with a core—as a quantity from the respective received field strength and/or the respective signal to noise ratio (SNR) and/or the respective bit error rate (BER) and/or the available data rate in the mobile network used and/or the wireless network type, and/or potentially needed roaming and/or the decoder Audio Quality (Service) and/or the Fast Information Channel (FIC) and/or the Received Signal Strength Indicator (RSSI) and/or an existing stereo/mono switchover and/or a cost factor that maps, for example, energy consumption and/or resource utilization and/or monetary costs associated with the receive path, in such a manner that the time profile of the individual listed quantities is considered and in particular isolated short-term over- or undershoots by the criterion parameter of the two threshold values that occur immediately after a switchover takes place are prevented. This has the advantage that the quality of a receive path is then judged not only on the basis of a single measured value. Moreover, a hysteresis, i.e. an effect of the previous time profile of the listed quantities on the current approach, can also be realized with the method. As a consequence, the above-mentioned ping-pong effect can be prevented.

It is also provided that the criterion parameter of the different receive paths is processed as a quantity such that the expected changes in the respective receive field strength and/or the respective signal-to-noise ratio (SNR) and/of the respective bit error rate (BER) and/or the available data rate in the mobile network used and/or the mobile network type, and/or the potentially necessary roaming and/or the Decoder Audio Quality (Service) and/or the Fast Information Channel (FIC) and/or the Received Signal Strength Indicator (RSSI) and/or a present stereo/mono switchover and/or a cost factor, which maps e.g. energy consumption and/or resources and/or monetary costs in conjunction with the receive path, is taken into account. This advantageously enables with the method a preparation of switching between different receive paths due to anticipated changes in the quality of the different receive paths, i.e. a forecast behavior. In particular, information from possible route planning may be taken into account.

Preferably, switching to a delayed receive path, such as the Internet radio or Digital Audio Broadcast (DAB) may take place by way of cross-fading or a silencing, so-called "Mute. The user then advantageously does not perceive the switchover as abrupt and unpleasant.

Furthermore, switching may take place from a delayed receive path, such as the Internet radio or Digital Audio Broadcast (DAB) to a delay-free receive path such as FM or AM in two different ways: Either without maintaining the delay, i.e. by skipping information, or by maintaining the delay, i.e. without skipping of information—in the latter case in particular with the aid of a correlation method and by buffering of the audio broadcasting signal from the delay-free receive path. These two options can be performed either in accordance with a basic setting or in response to a specific election or prompt by the user, for example, via a user option in the Human-Machine-Interface (HMI) of a controller or for example as a hardware solution in the form of a control element, such as a knob or button. Advantageously, the user can then switch, according to his preference, either "live", i.e. the information received by the user is again current and delay-free, or the user can continue to follow the instantaneous flow of information without interruption, without skipping the flow of information.

The invention also encompasses an information presentation system for acoustically emitting audio broadcasting signals in a vehicle, with at least one acoustic source and a receiver for receiving audio broadcasting signals, which includes in particular the function of receiving, of evaluating the signals, and controlling switching between the receive paths. Here, at least two receive paths for transmitting audio broadcasting signals to the receiver are included, wherein audio broadcasting signals can be transmitted via a first and at least one second receiver into the vehicle, where they can be received, wherein the quality of the first receive path is assessed with reference to an audio broadcasting signal receivable via the first receive path, and wherein the second receive path is also assessed by the receiver by way of a criterion parameter on the basis of the audio broadcasting signal receivable via the second receive path. It is essential here that the receiver is designed such that during a broadcast of the audio broadcasting signal over one of the receive paths, the current receive path, depending on a comparison of the criterion parameter of the current receive path with a first threshold, a preparatory phase is started for preparing switching from the current receive path, i.e. the receive path currently intended for broadcasting, to the other receive path, or in the case of several other receive paths, to the best receive path on the accordance with the respective criterion parameters, and in the preparatory phase the criterion parameter of the current receive path is compared with a second threshold value that is lower than the first threshold value, and that when the second threshold is underrun, a switchover to the other receive path is checked.

The invention includes also a vehicle having an information presentation system as described above or an advantageous embodiment thereof.

Additional features of the invention will become apparent from the claims, the figures and the description of the figures. All features and feature combinations mentioned above in the description, as well as the features and feature combinations subsequently referred to in the description of the figures and/or illustrated individually in the figures are used not only in the particular combination indicated but also in other combinations or individually. The invention discloses and includes therefore also embodiments of the invention, which although not explicitly shown and described in the figures, can be derived and generated from the described embodiments through separate combinations of features.

BRIEF DESCRIPTION OF THE DRAWING

Exemplary embodiments of the invention will now be explained below with reference to schematic drawings, which show in.

DETAILED DESCRIPTION OF PREFERRED EMBODIMENTS

Figure 1:
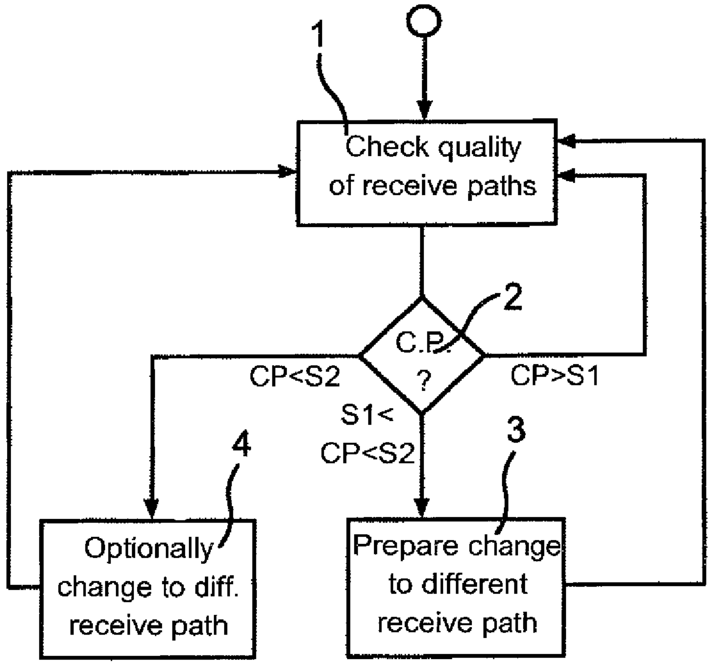
FIG. 1 a flow chart of an exemplary embodiment of a method according to the invention.

FIG. 1 shows a flow diagram of an exemplary embodiment of a method according to the invention. A first step 1 includes here continuously and simultaneously checking the reception quality of the available receive paths, i.e., checking the criterion parameters of all receive paths. In a second step 2, the criterion parameter of the selected receive path, i.e. the receive path currently used for broadcasting, is compared with the predetermined first and second threshold. If the value of the criterion parameter exceeds the first value of the first threshold, no further action is taken and checking of the reception quality is continued in accordance with step 1. If the value of the criterion parameter is between the values of the first and second threshold, a change to the different receive path, or when several possible receive paths exist, to a different receive path is prepared in a further step 3. This includes in particular caching the received audio broadcasting signal received over to the other receive path. Furthermore, checking of the quality of the receive path based on the criterion parameter in step 1 will be continued. If the value of the criterion parameter of the selected receive path is below the value of the second threshold, a switchover to the other receive path is checked and optionally carried out after step 2, in a step 4. In any case, the reception quality of all receive paths is continually checked according to step 1 after the checking and switchover.

For example, digital and analogue (FM) broadcasting and Internet radio may be available as receive paths. The audio broadcasting signal received via digital broadcasting is currently emitted. According to step 1, the quality of all three receive paths is then checked on an ongoing basis based on the criterion parameter. If the criterion parameters of digital broadcasting drops below the first threshold, a switchover to the Internet radio is for example prepared through caching, in step 3. If the reception via digital broadcasting deteriorates further, i.e. when the corresponding criterion parameter drops below the second threshold value, a switchover is checked according to step 4. For example, if in accordance with the criterion parameters, the analog broadcast signal is now to be preferred over the internet radio, a switchover to the analog broadcasting signal may be performed. If the criterion parameter of the analog broadcast signal exceeds the first threshold value, caching according to step 2 is stopped. Should the analog FM signal now deteriorate, another switchover may again be prepared depending on the criterion parameter according to step 3, i.e. for example, caching of the audio broadcasting signal receivable over the Internet may be initiated. If now, in a further deterioration of the analog signal, a switchover is checked according to step 4 and if, for example, the Internet radio is the preferable receive path, then the cached content is accessed and the switchover to Internet radio takes place without any perceptible pause in the acoustic emission of the audio broadcasting signal for the user. Without a preparatory caching, the user would have to wait until the information received via the Internet radio is adequate and can thus be emitted acoustically. For example, it can take up to 30 seconds after setting up a connection to the Internet radio provider, depending on the available connection speed, until the acoustic emission of an audio broadcasting signal received over the Internet can begin, i.e. emission of an audio signal receivable over the Internet. During this time, acoustic emission the audio broadcasting signal would be interrupted.

Figure 2:
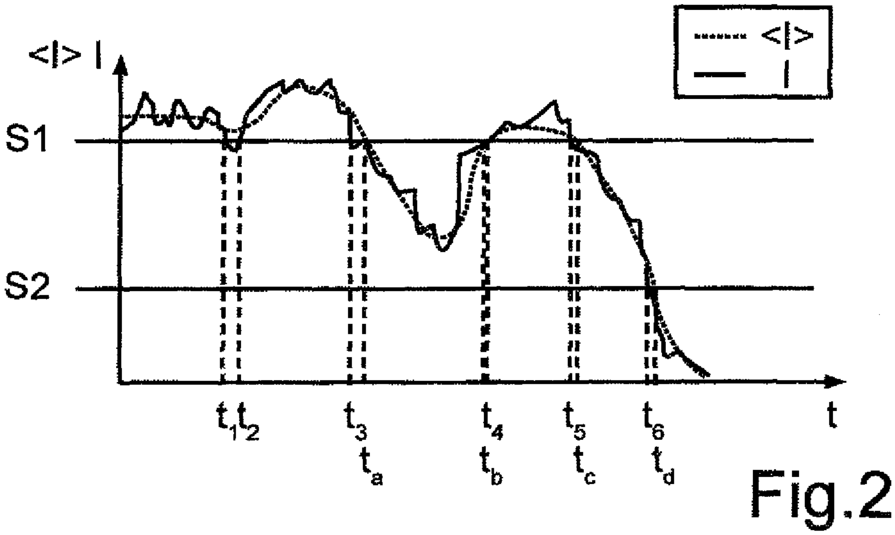
FIG. 2 an exemplary time profile of two criterion parameters.

FIG. 2 shows an exemplary time profile of two different criterion parameters for the same situation. The two criterion parameters are here, for example, the intensity I of an FM broadcast signal and an averaged intensity <I> derived from the intensity I. When the FM broadcast signal deteriorates, a switchover to the Internet radio is contemplated in the present example, while digital broadcast reception is not possible. Both intensities I, <I> are plotted as a function of time t. Also shown are the threshold values S1, S2 associated with the first and second threshold. The threshold value S1 is here greater than the threshold value S2. The two criterion parameters still exceed the threshold value S1 at the times before t1. At a time t1, the first criterion parameter, i.e. the intensity I, drops below the threshold value S1, and rises a little later, at a time t2, again above the threshold value S1. A switchover is hence prepared between the times t1 and t2. Because Internet radio is the alternate receive path, i.e. a good reception quality for Internet radio is assumed in this example and Internet radio is therefore considered for a future switchover, the audio broadcasting signal received via the Internet is cached.

However, this is not desirable here, because a short outlier in the reception quality should not to cause a switchover to another receive path and, consequently also not a preparation for a switchover. The preparatory phase or caching is avoided by using the averaged intensity <I> as a criterion parameter, because of brief drop in the intensity I below the threshold value S1 is not noticeable in the averaged intensity <I>. However, for example, a subsequent, renewed drop in the intensity I below the threshold value S1 at a time t3 is noticeable even when considering the averaged intensity <I>—albeit at a time $t_A$ that is slightly offset relative the time t3. This is the case because of the drop in the intensity I below the threshold value S1 at the time t3 is not just a brief Delta-peak-shaped outlier, but represents a longer-lasting decrease in the intensity I. Consequently, it makes sense to prepare for a switchover to another receive path, i.e. to perform caching. This applies here both to the consideration of the averaged intensity <I> as well as to consideration of the intensity I as a criterion parameter. For example, if the intensity I or averaged intensity <I> exceeds the first threshold value S1 after t4 or $t_B$, the preparatory phase or caching is interrupted because a switchover to a different receive path is no longer expected to be required, and the cached information is discarded. Only after a renewed drop in intensity I or the averaged intensity <I> below the threshold value S1 at the time t5 or $t_C$, caching is starting again in the present example. If for example outdated cached information still exists in this case, this information is discarded earlier. This causes in the illustrated example at the time t6 and $t_D$, when the two criterion parameters drop below the second threshold value S2, a switchover to Internet radio as the receive path. The cached audio broadcasting signal can then be instantly accessed, i.e. the audio broadcasting signal received via the Internet radio can be broadcast without an audible delay.

Depending on the user preference and the selected criterion parameters, when the quality of the Internet radio deteriorates or, for example, the intensity of the FM audio broadcasting signal improves, a switchover back to the analog radio receiver path may occur. When switching back, the user can then jump back to the current radio broadcast content that is currently broadcast in analog delay-free FM radio which is timewise ahead of the Internet radio, for example, by way of a button, a "Live" button.

Figure 3:
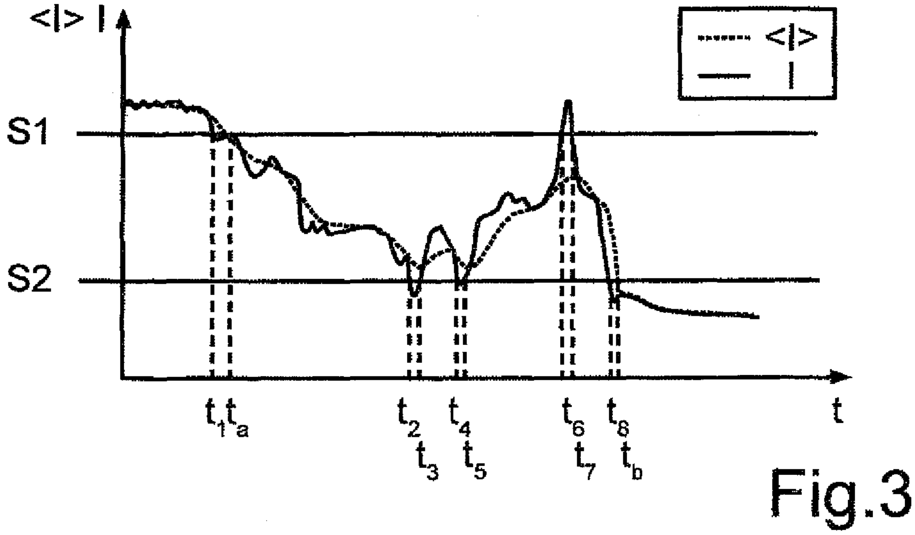
FIG. 3 an exemplary profile of two further criterion parameters.

FIG. 3 shows another exemplary profile of two criterion parameters. For example, analog radio reception via FM is not desirable here, leaving for example DAB as digital broadcasting and Internet radio as receive paths. The intensity I of, for example, the digital broadcast signal DAB or the corresponding averaged intensity <I> is selected as the y-axis and time t as the x-axis. The two threshold values S1 and S2 are also indicated. Initially, i.e. at times before t1, the intensity I and the averaged intensity <I> are still above the threshold value S1, which however changes at the time t1 or $t_A$. The strongly fluctuating intensity I and consequently also the averaged intensity <I> decrease after the times t1 or $t_A$ from below the first threshold value S1 almost to the second threshold value S2, which triggers in the present example, with the Internet radio as an alternate receive path, caching of the audio broadcasting signal received via the Internet radio, since a good reception quality for the Internet radio is assumed in this example. The intensity I crosses the threshold value S2 at the closely-spaced successive time instants t2, t3, t4 and t5 multiple times. This can cause a multiple switchover in quick succession between the different receive paths, the so-called. "ping-pong" effect, which is very annoying for the user. This is in the present example avoided from the outset by using the averaged intensity <I> as a criterion parameter, because the averaged intensity <I> does not follow the short-term fluctuations of the intensity I and therefore does not cross the second threshold S2 at the corresponding times t2, t3, t4 and t5. At or after the time t5, selection of the intensity I as a criterion parameter would have already caused repeated switching back and forth between, in the present case, DAB and the Internet radio. This is prevented, for example, by selecting the averaged intensity <I> as the criterion parameter.

After time t5, the intensity I rises again, and briefly rises even to a value above the first threshold value S1 between the immediately successive points in time t6 and t7. The averaged intensity value <I> follows this discontinuous increase only with a delay and does not exceed the first threshold value S1. The choice of the intensity I as a criterion parameter causes caching to be paused or stopped at the time t6 because the threshold value S1 is exceeded. Since the intensity I again drops sharply after a very brief recovery between t6 and the immediately following time t7 and drops below the threshold value S2 at a time t8, stopping caching can have adverse consequences—for example, when not enough time has passed between the two points in time t7 and t8 to completely fill the buffer again. In this case, there is not sufficient information in the buffer when switching to the Internet radio so that the user may be forced to accept an interruption in the broadcast audio broadcasting signal during a switchover, wherein the duration of the interruption is determined, for example, by a technically required further caching. Using the averaged intensity <I> prevents the threshold value S1 from being briefly exceeded by a Delta-peak-shaped signal, and the signals from the internet radio are not interrupted at t6 due to cashing. For example, when the averaged intensity <I> drops at the time $t_B$, which corresponds to the drop in the intensity I at the time t8, no renewed cashing is required, i.e. the user is immediately supplied with information from the Internet radio without an audible pause via the cached audio broadcasting signal.

If, for example, the DAB signal is again available with adequate intensity I at a later time, a switchover from the Internet radio back to DAB reception may be desired due to cost reasons. This is implemented, for example, by taking into account the effect of the costs on the criterion parameter. Like the FM audio broadcasting signal which cannot be selected in the present example, the DAB audio broadcasting signal is also timewise ahead of the Internet audio broadcasting signal in general, so that information can be skipped when switching from Internet radio to DAB as the receive path. However, for example, the DAB audio broadcasting signal may also be cached and the same audio broadcasting signal may be switched inaudibly from Internet radio to DAB as a receive path, for example, by way of a correlation method. In this case, the audio broadcasting signal received via DAB is broadcast acoustically with a delay to the identical to the audio broadcasting signal previously received via Internet radio.

What is claimed is:

1. A method for acoustic broadcasting of audio broadcasting signals in a vehicle, comprising:

transmitting audio broadcasting signals to the vehicle over a first and over at least one second receive path and receiving the transmitted audio broadcasting signals in the vehicle, evaluating the first receive path by at least one criterion parameter based on an audio broadcasting signal receivable via the first receive path, evaluating the second receive path by a second criterion parameter based on the audio broadcasting signal receivable via the at least second receive path, during emission of the audio broadcasting signal over one of the first or the at least second receive paths representing a current receive path, starting a preparatory phase for preparing a switchover from the current receive path to an other receive path based on a comparison of a criterion parameter of the current receive path with a first threshold value, in the preparatory phase, comparing the criterion parameter of the current receive path with a second threshold value that is lower than the first threshold value and checking, whether a switchover to the other receive path is to be carried out, and terminating the preparatory phase when the criterion parameter again exceeds the first threshold value at least for a predefinable overshoot time interval.

2. The method of claim 1, and further comprising while checking whether the switchover is to be carried out, comparing the criterion parameter of the other receive path with the second threshold value, and performing a switchover to the other receive path when the criterion parameter of the other receive path has not dropped below the second threshold value or the underrun of the criterion parameter of the other receive path is less than the underrun of the criterion parameter of the current receive path.

3. The method of claim 1, and further comprising caching information of the audio broadcasting signal that was received during the preparatory phase over the other receive path and that is to be emitted after a possible switchover to the other receive path.

4. The method of claim 3, wherein caching is started, when the other receive path, in which information contained in the audio broadcasting signal is presented with a time offset corresponding to an offset time interval in relation to the presentation of information on the current receive path.

5. The method of claim 3, wherein caching is started, when a receive path for a future emission of the audio broadcasting signal comprises a mobile radio channel.

6. The method of claim 3, wherein caching is started, when a receive path for a future emission of the audio broadcasting signal comprises Internet radio.

7. The method of claim 6, wherein caching is started when enabling a switchover from a broadcast-based receive mode to the Internet radio.

8. The method of claim 1, wherein the preparatory phase is terminated when an actual switchover to the other receive path is performed.

9. The method of claim 1, wherein a switchover from the current receive path to the other receive path takes place depending on whether the second threshold value is underrun by the criterion parameter for at least a predeterminable undershoot time interval.

10. The method of claim 1, and further comprising evaluating as criterion parameters for different receive paths at least one of a respective received field strength, a respective signal-to-noise ratio, a respective bit error rate, a data rate available in a mobile network, a wireless network type, potentially required roaming, a decoder Audio Quality (Service), a Fast Information Channel (FIC), a Received Signal Strength Indicator (RSSI), a stereo/mono switchover, and a cost factor that maps resource utilization comprised of at least one of energy consumption, data volume, storage capacity, computation capacity, and monetary costs associated with a particular receive path.

11. The method of claim 1, and further comprising processing as criterion parameters of the different receive paths by way of signal processing steps or calculations, or both, at least one quantity selected from a respective received field strength, a respective signal-to-noise ratio, a respective bit error rate, a data rate available in a mobile network, a wireless network type, potentially required roaming, a decoder Audio Quality (Service), a Fast Information Channel (FIC), a Received Signal Strength Indicator (RSSI), a stereo/mono switchover, and a cost factor that maps resource utilization comprised of at least one of energy consumption, data volume, storage capacity, computation capacity, and monetary costs associated with a particular receive path, by taking into consideration a time profile of the at least one quantity.

12. The method of claim 11, and further comprising preventing isolated brief overshoots or undershoots of the first and second threshold values by the criterion parameters or over- or undershoots that occur immediately after a switchover in the time profile.

13. The method of claim 1, and further comprising processing the criterion parameter of the different receive paths as a quantity by also taking into consideration at least one of expected changes in the respective received field strength, a respective signal-to-noise ratio, a respective bit error rate, a data rate available in a mobile network, a wireless network type, potentially required roaming, a Decoder Audio Quality (Service), a Fast Information Channel (FIC), a Received Signal Strength indicator (RSSI), a stereo/mono switchover, and a cost factor that that maps resource utilization comprised of at least one of energy consumption, data volume, storage capacity, computation capacity, and monetary costs associated with a particular receive path.

14. The method of claim 1, wherein a switchover to a delayed receive path occurs by way of cross-fading or silencing.

15. The method of claim 14, wherein the delayed receive path comprises Internet radio.

16. The method of claim 1, wherein a switchover from a delayed receive path to a delay-free receive path occur either without maintaining a delay or with maintaining the delay, in which case a correlation method and caching of the audio broadcasting signal from the delay-free receive path are used.

17. An information presentation system for acoustic emission of audio broadcasting signals in a vehicle, comprising:

at least one acoustic source, a receiver for receiving audio broadcasting signals, and at least a first and at least one second receive path for transmitting audio broadcasting signals to the receiver, wherein the audio broadcasting signals are transmitted to the vehicle and received in the vehicle via the first and the at least one second receive path, wherein the first receive path is evaluated by the receiver by way of at least one criterion parameter based on an audio broadcasting signal received by the receiver, and wherein the at least one second receive path is also evaluated by the receiver by way of a second criterion parameter based on the audio broadcasting signal received by the receiver, wherein the receiver is configured such that during emission of the audio broadcasting signal over one of the first or the at least second receive paths representing a current receive path, a preparatory phase for preparing a switchover from the current receive path to an other receive path is started based on a comparison of a criterion parameter of the current receive path with a first threshold value, and in the preparatory phase the criterion parameter of the current receive path is compared with a second threshold value that is lower than the first threshold value, a check is carried out for switching to the other receive path, and wherein the receiver is further configured to terminate the preparatory phase when the criterion parameter again exceeds the first threshold value at least during a predefined time interval.

18. A vehicle comprising an information presentation system according to claim 17.

* * * * *